Feb. 24, 1959  H. S. FREDERICK ET AL  2,874,852
ELEVATING MECHANISM
Filed Aug. 31, 1948  6 Sheets-Sheet 3
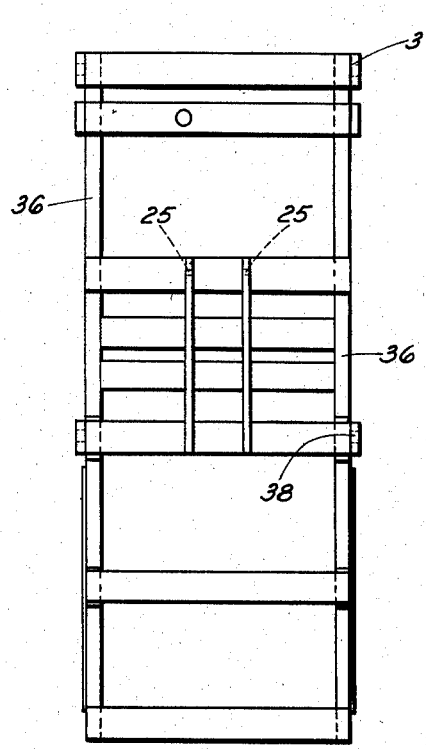
_FIG. 9._
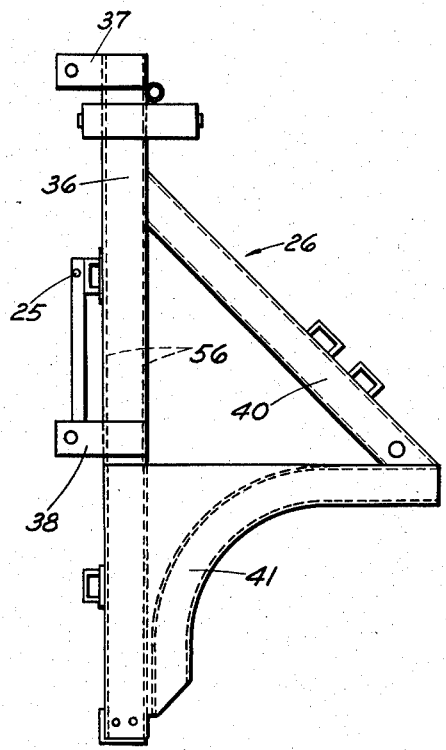
_FIG. 10._
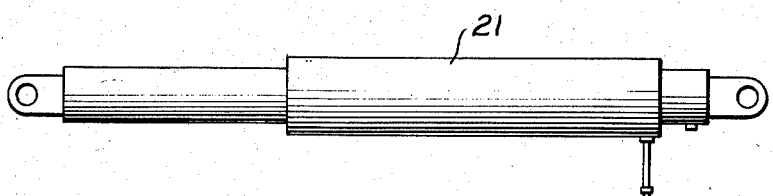
_FIG. 6._
INVENTORS
Herbert S. Frederick
BY Martin A. Kinsella
Roland A. Anderson
ATTORNEY Feb. 24, 1959

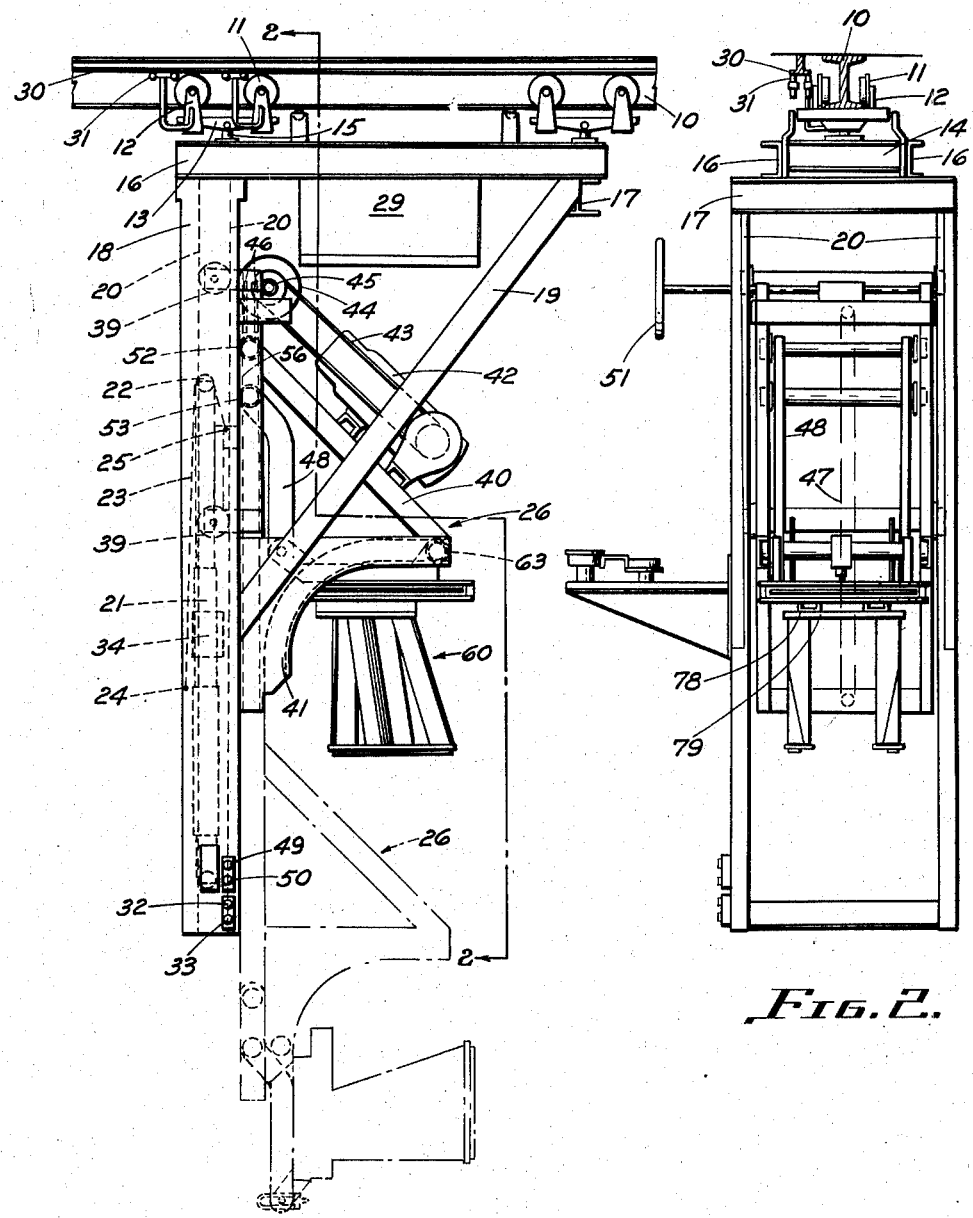

H. S. FREDERICK ET AL 2,874,852

ELEVATING MECHANISM

Filed Aug. 31, 1948

INVENTORS
Herbert S. Frederick
BY Martin A. Kinsella

Roland A. Anderson

ATTORNEY

Feb. 24, 1959 H. S. FREDERICK ET AL 2,874,852
ELEVATING MECHANISM
Filed Aug. 31, 1948
6 Sheets-Sheet 5

INVENTORS
Herbert S. Frederick
BY Martin A. Kinsella

Roland A. Anderson
ATTORNEY

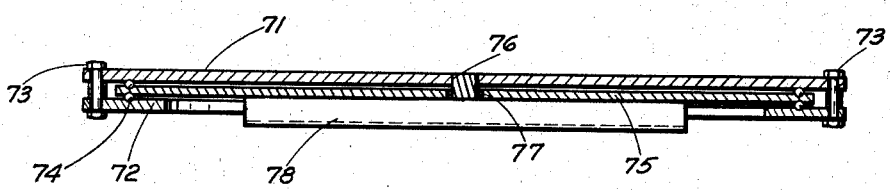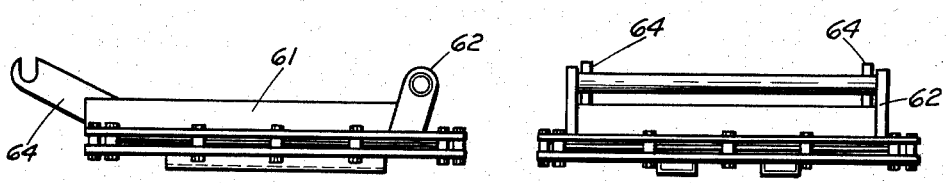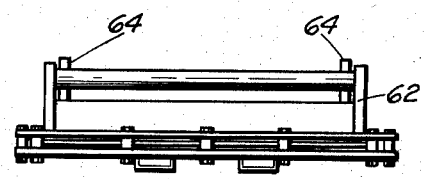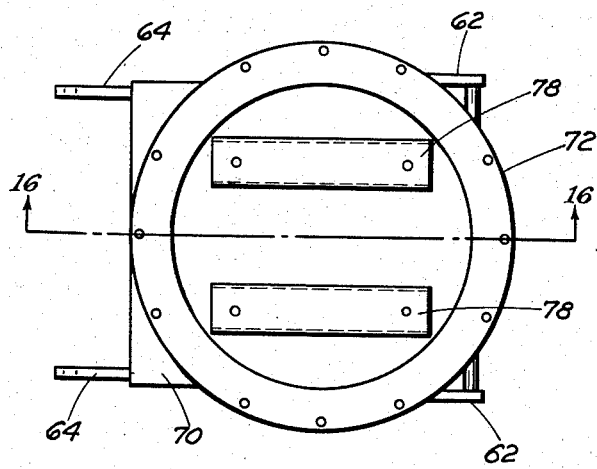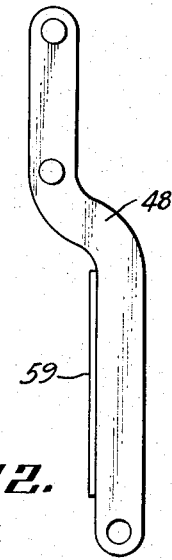

United States Patent Office

2,874,852
Patented Feb. 24, 1959

2,874,852
ELEVATING MECHANISM

Herbert S. Frederick, Middlesex County, Mass., and Martin A. Kinsella, Wilmington Manor, Del., assignors to the United States of America as represented by the United States Atomic Energy Commission Application August 31, 1948, Serial No. 47,048

4 Claims. (Cl. 214—1)

The present invention relates to elevators, and in particular it pertains to that type of elevator which is arranged for movement both in a horizontal and in a vertical direction so that the elevating mechanism may be employed for servicing equipment at separated points in a plant.

In certain types of industrial operations it is necessary to remove heavy plates from equipment so that such equipment may be serviced. To remove these plates, means must be provided for securing the plates to a bracket member, which may then be lifted, and rotated through a desired number of degrees. Further means must be provided for supporting the bracket and moving it from point to point in the plant so that successive pieces of equipment may be serviced.

It is an object of this invention to provide an elevator capable of performing the foregoing operations and provided with suitable means for stopping the elevator at any desired point in its cycle.

Further objects and advantages of this invention will appear in the present specification.

In general, the function of the elevator is to hold a load of approximately seven hundred pounds while the load is being transported on an overhead monorail support. Means are provided for rotating the load through 90 degrees from a vertical to a horizontal position in approximately 30 seconds, and to raise or lower the load while in either position through a travel of 5′6″ at a rate of 8 to 12 inches per minute. Suitable safety devices to limit travel and to prevent the load from falling in case of cable failure are provided. Electric power is supplied to the elevator through a trolley pick-up. All operating mechanisms are mounted on the elevator chassis, so that it forms a movable self-contained unit.

In accordance with the present invention, the main elevator chassis is suspended from a monorail. The chassis, in turn, supports the sub-assemblies which comprise an auxiliary carriage assembly, an emergency stop brake assembly, a hydraulic assembly, a load bracket assembly, a lifting link assembly, and a bracket support assembly. By dividing the elevator into sub-assemblies, the final assembly of the complete elevator is simplified. The sub-assemblies are interchangeable, thereby facilitating repairs to the elevator in case of breakdowns.

The present invention may be more completely understood by reference to the appended drawing, wherein:

Fig. 1 is a side elevation of an elevator constructed in accordance with this invention;

Fig. 2 is an end view of the machine taken along line 2—2 of Fig. 1;

Fig. 6 is a plan view of an hydraulic ram;

Fig. 9 is an end view of the elevator carriage;

Fig. 10 is a side view of the elevator carriage shown in Fig. 9;

Fig. 12 is a side view of the elevator sub-carriage shown in Fig. 11;

Fig. 13 and Fig. 14 are side elevations of the turntable employed in the present machine;

Fig. 15 is a plan view of the turntable looking up at the turntable;

Fig. 16 is a cross section through the turntable only, taken on line 16—16 of Fig. 15;

Figure 3:
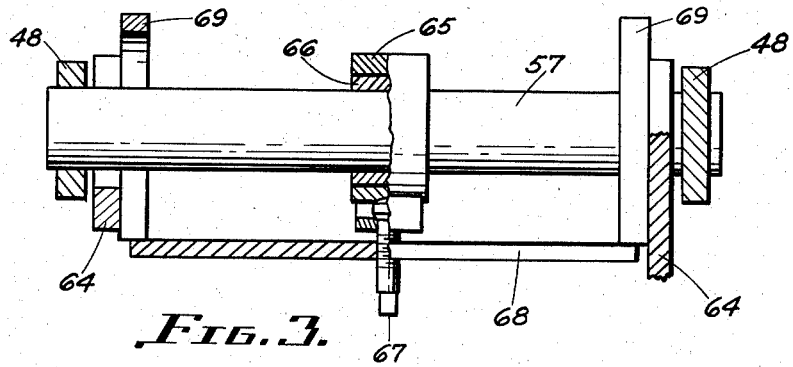
Fig. 3 is a detail of the elevator turntable adjustment with portions thereof broken away.

With reference to the embodiment of this invention illustrated in Figs. 1 and 2, the elevator is suspended from a monorail 10 by means of wheels 11. The wheel axles support yokes 12, which, in turn, are secured to a connecting member 13. The latter supports a girder 14 by means of an upright 15.

Figures 7, 8:
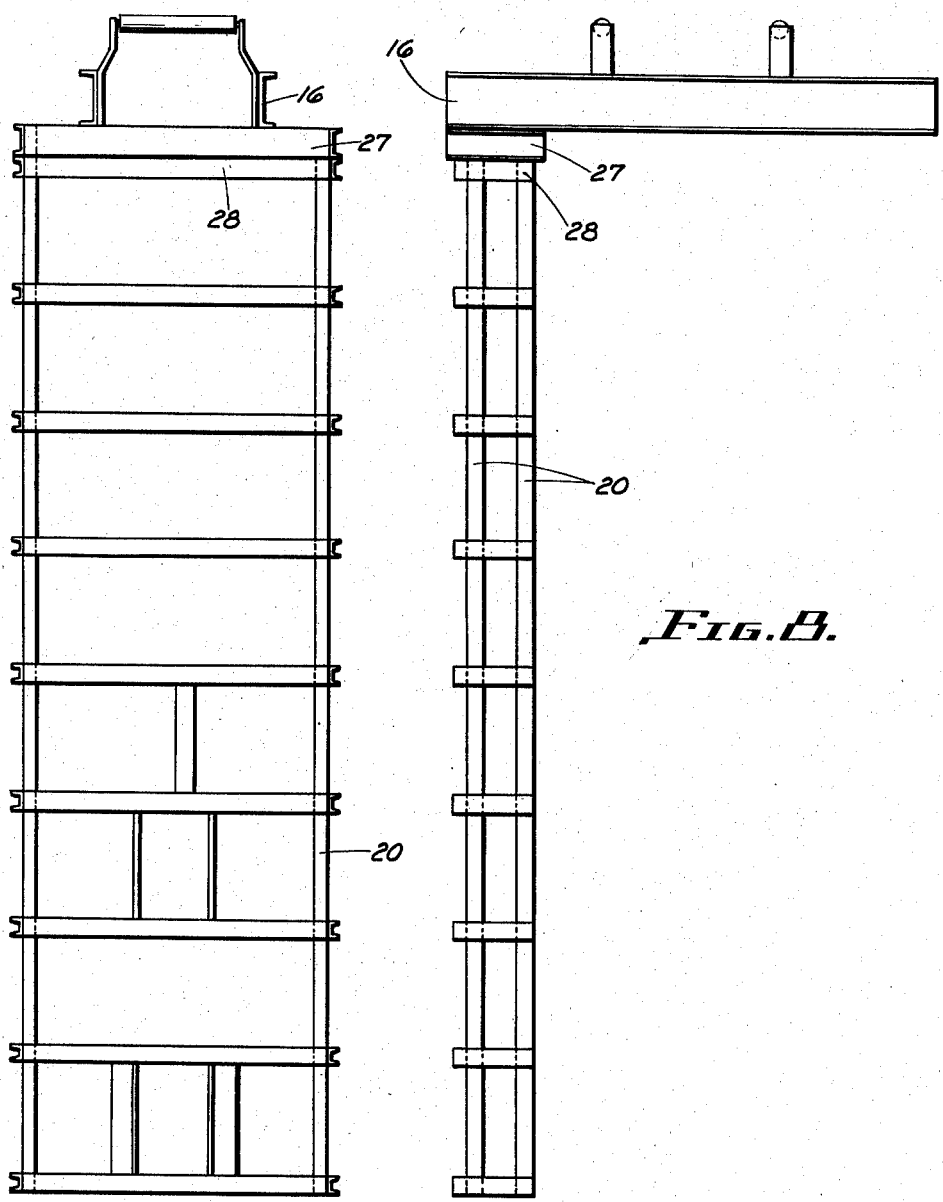
Fig. 7 is an end view of the elevator chassis.
Fig. 8 is a side view of the chassis shown in Fig. 7.
Figure 17:
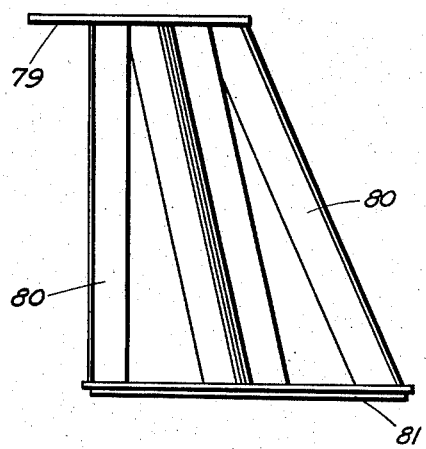
Fig. 17, Fig. 18 and Fig. 19 are, respectively, end, side, and bottom views of the bracket member.
Figure 18:
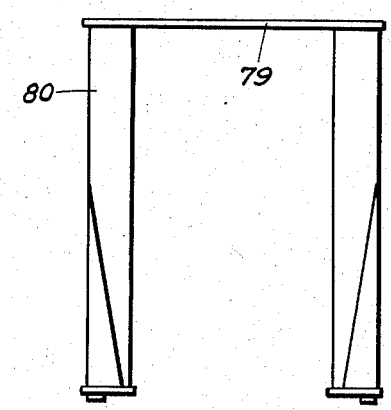
Figure 19:
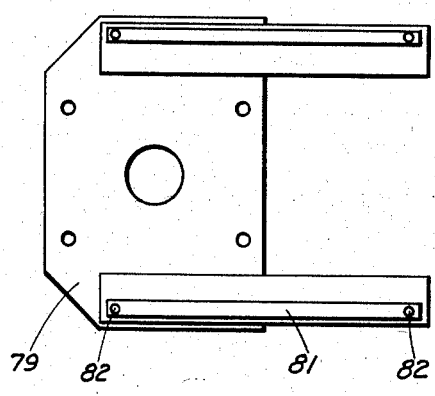

Girder 14 is welded or otherwise secured to a pair of supporting beams 16 from which the elevator chassis is suspended. The chassis comprises a horizontal beam 17 secured to one end of beams 16. A pair of beams 27, 28 are similarly secured to the opposite end of beams 16 (Fig. 7). Braces 19 stiffen the chassis, the main vertical members of the chassis 20, 20 (Figs. 1 and 8) secured to beams 27, 28, serve as tracks for raising or lowering the carriage 26. Where strength and rigidity are required, these vertical members 20, 20 may be machined from steel forgings. A sheet metal cover 18 (Fig. 1) protects the operating mechanism of the chassis.

The main hoisting mechanism consists of an oil operated hydraulic ram 21 (Fig. 6), which may have a five inch piston and a thirty and three quarter inch stroke. A hoisting head mounting two sprockets 22 is located at the top of the piston. This hoisting head may be arranged to operate along vertical guide tracks if desired. Two sets of roller chains 23, either of which is of sufficient strength to support the load, are attached to the chassis at 24, led over sprockets 22 and secured to the carriage 26 at 25 (Figs. 1, 9 and 10). By this arrangement the carriage 26 will move vertically a distance of sixty one and one-half inches when the hydraulic piston moves thirty and three quarter inches. As shown in Fig. 1, the piston is extended to its full length and the carriage 26 is at its uppermost position. When the piston is fully retracted the carriage drops to its lowest position, as indicated in Fig. 1 by dotted lines.

Oil pressure is supplied to the hydraulic ram from a conventional assembly (not illustrated) which may include a two horsepower motor directly connected to an oil pump provided with the customary piping strainer, check valve, needle valve for flow adjustment and a discharge valve, all mounted on a cast iron oil reservoir. The pump may be suspended beneath the reservoir to assure it of an oil supply by gravity. The entire assembly may be contained in a housing 29 suspended from beams 16. An overhead trolley rail 30 and trolley wheels 31 furnish power for operating the hydraulic system. A pair of pushbuttons 32, 33 are mounted on the chassis and control operation of the motor and oil pump. A check valve in the hydraulic line serves to hold the hydraulic ram in any desired position when pressure on the elevating push button is released. Pressing the other push button opens a solenoid-operated drain valve in the oil discharge line permitting the piston to drop downwardly. Releasing this button allows the drain valve to close, leaving the load in any desired position.

Conventional safety devices may be installed to prevent the load from dropping in the event of failure of the chain 23. One such device, illustrated diagrammatically at 34 is so arranged that any slackness in either of the chains 23 will open an electric circuit and prevent further movement of the load until the trouble is investigated and corrected. In addition, a mechanical safety device may be mounted on the carriage and arranged to clamp tracks 20 in case the lifting chains 23 should fail. In devices of this sort the carriage 26 is clamped to the tracks by pressure between an eccentrically mounted hardened steel toothed wheel acting on the outside of the rail and a roller on the inner side of the rail. The toothed wheel is held clear of the rail by spring action as long as the chains 23 are taut. Any slackening of either chain allows immediate rotation of the eccentric wheel, throwing it against the track and bringing the clamping action into play. The weight of the load will increase the clamp pressure in such a device.

The elevator carriage 26 consists of a pair of vertical members 36 (Figs. 9 and 10) carrying upper and lower cross pieces 37, 38 which serve as mounts for the wheels 39 (Fig. 1) that move along tracks 20. Diagonal braces 40 support a pair of curved tracks 41.

Braces 40 also support a motor 42 (Fig. 1) that is employed to tip the load bracket support through a 90° arc. The motor drives a chain 43 which in turn actuates a sprocket 44, a worm gear 45 and sprockets 46. Roller chains 47 pass over the two sprockets 46 and are attached to the lifting link 48 (Figs. 1, 11 and 12) forming part of the elevator sub-carriage. A one-half horsepower eighteen hundred R. P. M. motor driving the high speed shaft of a 254:1 standard speed reducer is suitable for furnishing power to the tipping unit. Power for the unit is supplied by a flexible cable from the main chassis of the elevator. Conventional push button controls 49, 50 mounted on the chassis (Fig. 1) are provided for controlling operation of the tipper motor 42. The usual electrical limit switches are used to stop the motor when the load has reached either end of its travel. In the event that the tipper motor should fail, a handwheel 51 (Fig. 2) may be used to actuate the tipping mechanism.

Figure 4:
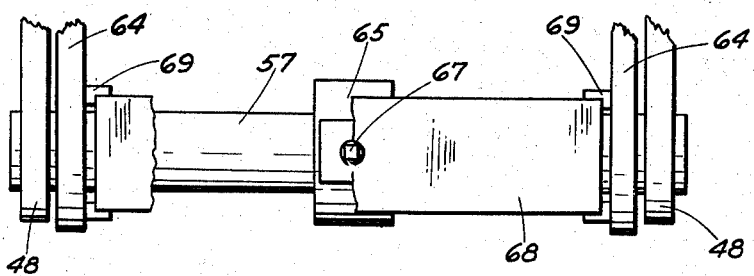
Fig. 4 is another view of the device of Fig. 3 from a different angle.
Figure 11:
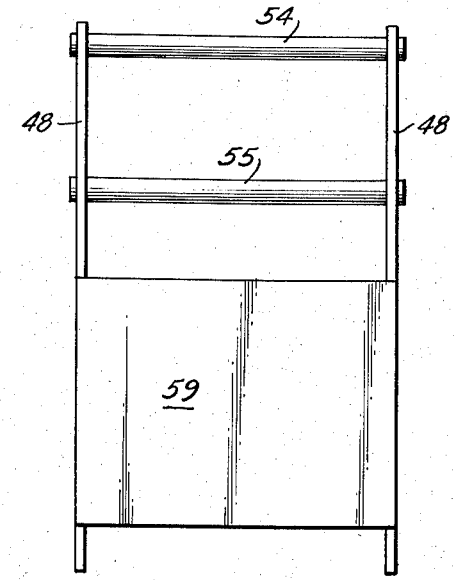
Fig. 11 is an end view of the elevator sub-carriage.

The purpose of the sub-carriage and related equipment is to rotate the load through a 90° arc from a vertical to a horizontal position. The sub-carriage consists essentially of a pair of offset lifting links 48 (Figs. 1, 11 and 12) mounting two sets of wheels 52 and 53 on either end of axles 54, 55 (Fig. 11). The wheels move in vertical tracks 56 forming part of the carriage (Figs. 1 and 10). A shaft 57 connects the lower ends of the lifting links and is arranged for engagement with the turntable arm 58 (Figs. 3 and 4). A plate 59 is welded to the lower portion of the links 48 and provides rigidity (Figs. 11 and 12).

The lifting links 48, in descending vertically from the position of Fig. 1, cause the turntable 60 to rotate through an angle of 90° and to drop to the lower position indicated in dotted lines in the said figure. The system of tracks and linkages by which this is accomplished is shown in Figs. 1, 3, 4, 5 and 14.

With reference to Figs. 13, 14 and 15 one end of the turntable support carries a pair of arms 62 which are welded to a pair of angle irons 61. The arms support wheels 63 (Fig. 1) which run on tracks 41. The latter describe a quarter circle from the horizontal to the vertical, so that the turntable is movable from a horizontal to a vertical position, as desired.

Figure 5:
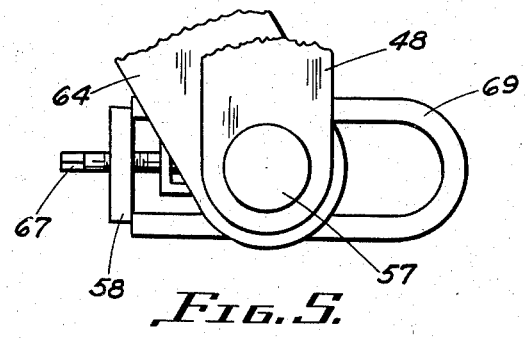
Fig. 5 is a detail of the adjusting means of Figs. 3 and 4.

A pair of brackets 64 are secured to the angle irons 61 at the end of the turntable support remote from arms 62. The construction of brackets 64 appears in greater detail in Figs. 3, 4 and 5. The brackets and their associated parts are arranged to rotate about shaft 57 when the turntable is raised or lowered. In assembling this apparatus, a collar 65, provided with a bushing 66 (Fig. 3) is put into position on shaft 57. A jackscrew 67 is threaded in cross-piece 68. A pair of U-shaped guides or yokes 69 are fixed to cross-piece 68 and together therewith form a frame rotatable around shaft 57. When the elevator is installed, the jackscrew 67 is adjusted to position the frame at such a distance from shaft 57 as will permit the turntable to move in the desired path without binding. The frame is then welded or otherwise permanently secured to the brackets 64 as shown in Figs. 3, 4, and 5. By this arrangement, the shaft 57 and lifting links 48 move in a vertical direction exclusively. The brackets 64 and the frame associated therewith, turn around shaft 57 through an angle of 90° during one movement of the lifting links from top to bottom or vice versa.

The angle irons 61 are welded or otherwise secured to a frame 70 (Fig. 15) which supports a circular plate 71 (Fig. 16). The latter cooperates with an annular member 72 and bolts 73 to form a ball bearing race 74. The ball bearings support a disc 75 which is rotatable about a shaft 76 disposed coaxially of the disc and of the plate 71. The disc is provided with a conventional bushing 77. A pair of channel irons 78 (Figs. 2, 15 and 16) are welded to disc 75 and furnish the support for the bracket assembly. The latter comprises a plate 79 (Figs. 2, and 17 through 19) attached to channel irons 78. Angle irons 80 are secured to the plate 79 and support a pair of parallel cross pieces 81. The cross pieces form the face of the bracket and are provided with drill holes 82 of suitable size to receive bolts for connecting the load to the bracket assembly prior to raising or otherwise moving the load.

In operation, the bracket is lowered to the position indicated in dotted lines in Fig. 1, and the load is bolted to cross-pieces 81. The load is then raised to the position shown in solid lines in Fig. 1. In so doing, the load may be first raised by actuating the hydraulic ram to raise the carriage 26 to its upper position. The load may then be rotated through 90° from a vertical to a horizontal position by operation of the tipper motor 42. This raises the lifting links 48 and wheels 63, following the curvature of tracks 41, and moves the bracket to the horizontal position. If desired, the load may be raised or lowered with the bracket in either the vertical or horizontal position.

Once the load has been raised to the position shown in Fig. 1, the chassis may be moved along the monorail to any desired point.

The present invention provides a single, self-contained, compact elevator that is adaptable to service an indefinite number of machines having heavy face plates which must be periodically removed and replaced. The elevator, being movable along a monorail, may be readily transported from point to point as occasion demands. The elevator chassis supports a vertically movable carriage, a vertically movable sub-carriage, a turntable movable through an arc of 90°, and all the means required to elevate or rotate the equipment as desired. By use of this equipment a single man can remove and replace face plates weighing hundreds of pounds by bolting a face plate to the elevator bracket assembly and then manipulating pushbuttons to elevate or rotate the load as desired.

Many variations and alterations of the illustrative embodiment may be made by those skilled in the art without departing from the spirit of the invention, the scope of which is defined in the appended claims.

We claim:

1. An elevator for servicing heavy machinery comprising an overhead monorail support, an electrically conducting trolley rail secured to said monorail, a chassis suspended from and movable along said monorail, trolley wheels mounted upon said chassis and contacting said trolley rail, a first set of vertical tracks forming a part of said chassis, a carriage mounted upon said chassis and vertically movable along said tracks, hydraulic means supported by the chassis and arranged to raise and lower the carriage, electrically operated means mounted on the chassis and arranged to actuate the hydraulic means, a second set of vertical tracks forming a part of the carriage, a sub-carriage including lifting links vertically movable along said second set of tracks, a third set of tracks forming a part of said carriage and describing a quarter circle from a vertical to a horizontal direction, a turntable secured at one end to the lifting links and movable along said third set of tracks whereby said turntable may be rotated through an angle up to 90° and load supporting means secured to said turntable.

2. An elevator for servicing heavy machinery comprising an overhead monorail support, an electrically conducting trolley rail secured to said monorail, a chassis suspended from and movable along said monorail, trolley wheels mounted upon said chassis and contacting said trolley rail, a first set of vertical tracks forming a part of said chassis, a carriage mounted upon said chassis and vertically movable along said tracks, hydraulic means supported by the chassis and arranged to raise and lower the carriage, electrically operated means mounted on the chassis and arranged to actuate the hydraulic means, a second set of vertical tracks forming a part of the carriage, a sub-carriage including lifting links vertically movable along said second set of tracks, an electric motor mounted on the carriage and arranged to raise and lower the sub-carriage, a third set of tracks forming a part of the carriage and describing a quarter circle from a vertical to a horizontal direction, a turntable secured at one end to the lifting links and movable along said third set of tracks whereby said turntable may be rotated through an angle up to 90°, and load supporting means secured to said turntable.

3. An elevator for servicing heavy machinery comprising an overhead monorail support, an electrically conducting trolley rail secured to said monorail, a chassis suspended from and movable along said monorail, trolley wheels mounted upon said chassis and contacting said trolley rail, a first set of vertical tracks forming a part of said chassis, a carriage mounted upon said chassis and vertically movable along said tracks, hydraulic means supported by the chassis and arranged to raise and lower the carriage, electrically operated means mounted on the chassis and arranged to actuate the hydraulic means, a second set of vertical tracks forming a part of the carriage, a sub-carriage including lifting links vertically movable along said second set of tracks, an electric motor mounted on the carriage and arranged to raise and lower the sub-carriage, a third set of tracks forming a part of the carriage and describing a quarter circle from a vertical to a horizontal direction, a turntable secured at one end to the lifting links and mounting wheels at an opposite end, said wheels being movable along the third set of tracks whereby the turntable may be rotated through an angle up to 90°, said turntable comprising a disc supported on ball bearings and pivoted for rotation through 360°, and load supporting means secured to and rotatable with said turntable, said means consisting of a bracket securable to a load.

4. An elevator for servicing heavy machinery comprising an overhead monorail support, an electrically conducting trolley rail secured to said monorail, a chassis suspended from and movable along said monorail, trolley wheels mounted upon said chassis and contacting said trolley rail, a first set of vertical tracks forming a part of said chassis, a carriage mounted upon said chassis and vertically movable along said tracks, hydraulic means supported by the chassis and arranged to raise and lower the carriage, electrically operated means mounted on the chassis and arranged to actuate the hydraulic means, a second set of vertical tracks forming a part of the carriage, a sub-carriage consisting of a pair of offset, laterally braced lifting links, two pairs of wheels journalled in said links and arranged to run on said second set of tracks whereby said sub-carriage is movable in a vertical direction, an electric motor mounted on the carriage and arranged to raise and lower the sub-carriage, a third set of tracks forming a part of the carriage and describing a quarter circle from a vertical to a horizontal direction, a turntable secured at one end to the lifting links and mounting wheels at an opposite end, said wheels being movable along the third set of tracks whereby the turntable may be rotated through an angle up to 90°, said turntable comprising a disc supported on ball bearings and pivoted for rotation through 360°, and load supporting means secured to and rotatable with said turntable, said means consisting of a bracket securable to a load.

References Cited in the file of this patent

UNITED STATES PATENTS 1,870,962    Oldroyd _____ Aug. 9, 1932